United States Patent [19]

Halls et al.

[11] 4,324,092
[45] Apr. 13, 1982

[54] CUTTERBAR WEAR STRIP

[75] Inventors: Lawrence M. Halls, New Holland; Irwin D. McIlwain, Lancaster, both of Pa.

[73] Assignee: Sperry Corporation, New Holland, Pa.

[21] Appl. No.: 203,173

[22] Filed: Nov. 3, 1980

[51] Int. Cl.³ .............................................. A01D 55/02
[52] U.S. Cl. ...................................................... 56/298
[58] Field of Search .................................. 56/296-312

[56] References Cited

U.S. PATENT DOCUMENTS

| | | | |
|---|---|---|---|
| 2,259,750 | 10/1941 | Johnson | 56/298 |
| 3,257,789 | 6/1966 | Carlson | 56/296 |
| 3,813,859 | 6/1974 | Fuller et al. | 56/260 |
| 4,021,999 | 5/1977 | Case | 56/298 |

Primary Examiner—Jay N. Eskovitz
Attorney, Agent, or Firm—Larry W. Miller; Frank A. Seemar

[57] ABSTRACT

A wear strip for a reciprocating cutterbar on a crop harvesting machine is disclosed wherein the wear strip projects upwardly and forwardly from the cutterbar support bar to a position above the rear edge of the knives. This wear strip operates to hold the rear edge of the knives downwardly against the support ridge on the knife guards. This wear strip is also operable to prevent severed crop material from passing between the knife guard and the support bar of the cutterbar and, therefore, being lost from the harvesting machine. The structural shape of the disclosed wear strip also helps retard the passage of severed crop material forwardly over the front of the cutterbar.

12 Claims, 3 Drawing Figures

CUTTERBAR WEAR STRIP

BACKGROUND OF THE INVENTION

The present invention relates generally to crop harvesting machines and, more particularly, to a wear strip for a reciprocating cutterbar.

Generally, crop harvesting machines include a crop harvesting header mounted at the forward end thereof to initiate the crop harvesting process. Headers have been developed for utilization in different crops and/or crop conditions. Combines, for example, utilize different crop harvesting headers for soybeans, corn and small grain. Normally, the header operates to cut standing crop material, consolidate it and then convey it rearwardly to the harvesting machine for further harvesting treatment.

Some crop harvesting headers have utilized specially formed knife guards to minimize the distance between the support ridge and the knife guards and the forward edge of the cutterbar support bar. If this gap were not minimized, severed crop material, particularly small grains, could pass therethrough and, therefore, be lost from the crop harvesting machine. Another source of crop loss is due to the passage of severed crop material in a forward direction over the front edge of the cutterbar.

Furthermore, hold down clips for reciprocating cutterbars are normally positioned in a spaced apart relationship along the transverse length of the cutterbar to hold preselected spots of the knife assembly into a position relative to the knife guards. Accordingly, only small amounts of area of the hold down clips countered any upwardly lifting forces applied to the knife assembly. Therefore, these hold down areas had to be specially hardened so as to be capable of withstanding the high forces. Further complicating this problem is the use of "flexible" cutterbars, which are capable of flexing vertically along the transverse length of the cutterbar to conform to changing ground contours, therefore, all of the cutterbar components must be capable of "flexing."

SUMMARY OF THE INVENTION

It is an object of this invention to overcome the aforementioned disadvantages of prior art by providing a cutterbar wear strip extending between the cutterbar support bar and the support ridge of the knife guards.

It is another object of this invention to minimize crop losses by preventing severed crop material from passing between the support bar and the knife guards and, therefore, being lost to the crop harvesting process.

It is another object of this invention to provide a continuous wear strip to hold the rearward edge of the knife elements downwardly against the support ridge of the knife guards.

It is still another object of this invention to provide a cutterbar wear strip having a structural shape that extends from a lower portion adjacent the support bar forwardly and upwardly to a elevated portion over the support ridge of the knife guard, thereby forming a lip, to retard the passage of crop material forwardly over the cutterbar.

It is a feature of this invention to provide a cutterbar wear strip that extends substantially continuously along the length of the cutterbar.

It is a further object of this invention to provide slots along the transverse length of the wear strip so that it can vertically flex with a flexible cutterbar.

It is another feature of this invention that the wear strip is detachably mounted to the support bar so as to be easily replaced and/or serviced.

It is still another feature of this invention to divide the wear strip into a plurality of segments to minimize replacement costs should the wear strip become damaged.

It is an advantage of this invention that the elevated portion of the wear strip holding the rearward edge of the knife elements downwardly against the support ridge of the knife guards will provide sufficient wear capabilities without being hardened.

It is a still further object of this invention to provide a cutterbar wear strip extending between the support bar and the knife guards which is durable in construction, inexpensive of manufacture, carefree of maintenance, facile in assemblage and simple and effective in use.

These and other objects, features and advantages are accomplished according to the instant invention by providing a wear strip for a reciprocating cutterbar on a crop harvesting machine wherein the wear strip projects upwardly and forwardly from the cutterbar support bar to a position above the rear edge of the knives. This wear strip operates to hold the rear edge of the knives downwardly against the support ridge on the knife guards. This wear strip is also operable to prevent severed crop material from passing between the knife guard and the support bar of the cutterbar and, therefore, being lost from the harvesting machine. The structural shape of the wear strip also helps retard the passage of severed crop material forwardly over the front of the cutterbar.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 3:
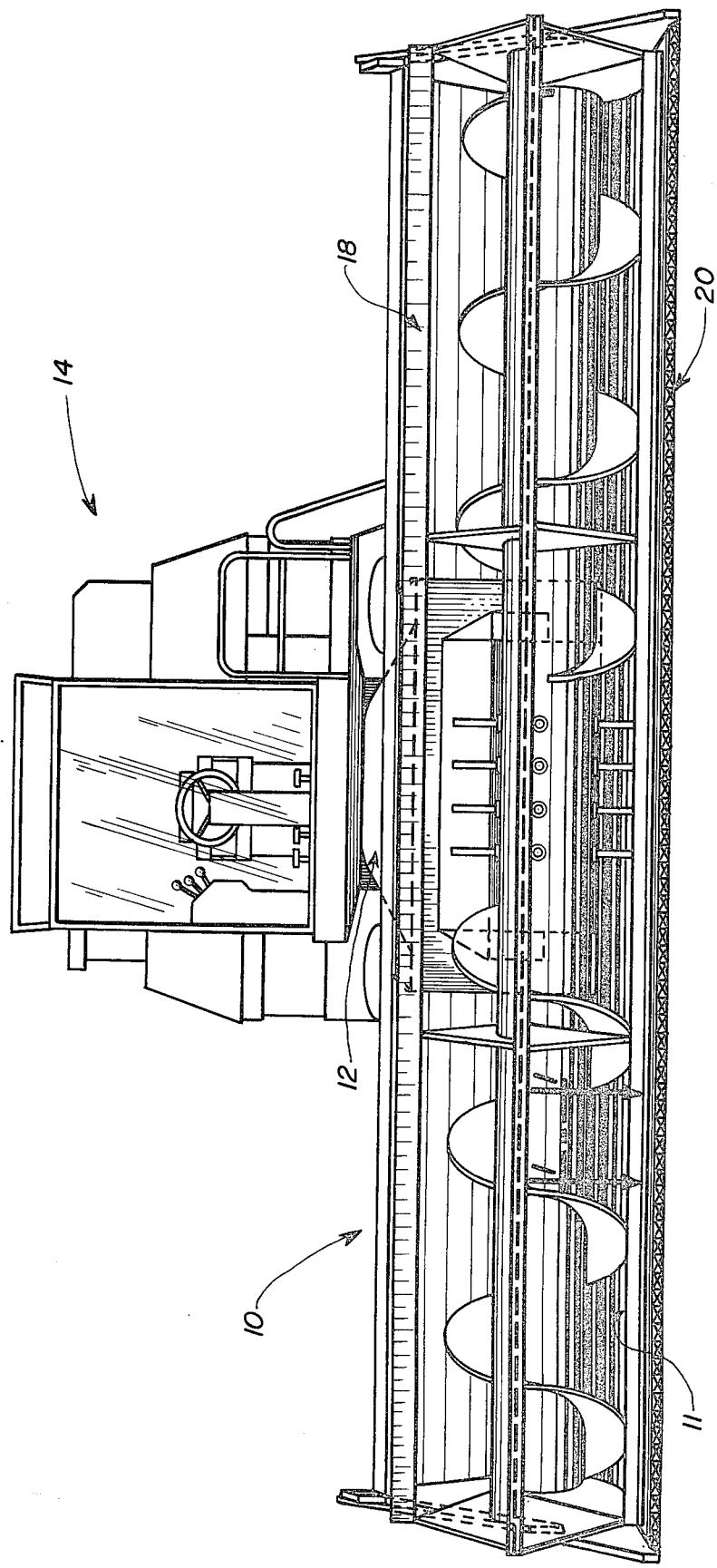
FIG. 3 is a front elevational view of a crop harvesting machine, commonly referred to as a combine, having a crop harvesting header for harvesting grain.

Referring now to the drawings and, particularly to FIG. 3, a front elevational view of a crop harvesting machine having a header for the harvesting of grain can be seen. Left and right references are used as a matter of convenience and are determined by standing at the rear of the machine facing the forward end, the direction of travel. For reasons of clarity, no drives to the operative parts of the crop harvesting header have been shown in the drawings. Such drives are conventional and are well known in the art.

The crop harvesting header 10 is shown mounted on the forward end of a feeder house 12 which, in turn, extends from a crop harvesting machine 14, commonly referred to as a combine. In general, the header 10 operates to sever standing crop material from the ground, converge it and deliver it rearwardly to the feeder house 12. The severed crop material is then conveyed to the crop harvesting machine 14 through the feeder house 12 for further harvesting treatment. A reciprocating cutterbar 20 is mounted at the forward end of the crop harvesting header 10 to sever the standing crop material. A reel 18 is rotatably mounted on the header and to assist in moving severed crop material rearwardly over the floor 11 of the crop harvesting header 10 toward the feeder house 12.

Figure 1:
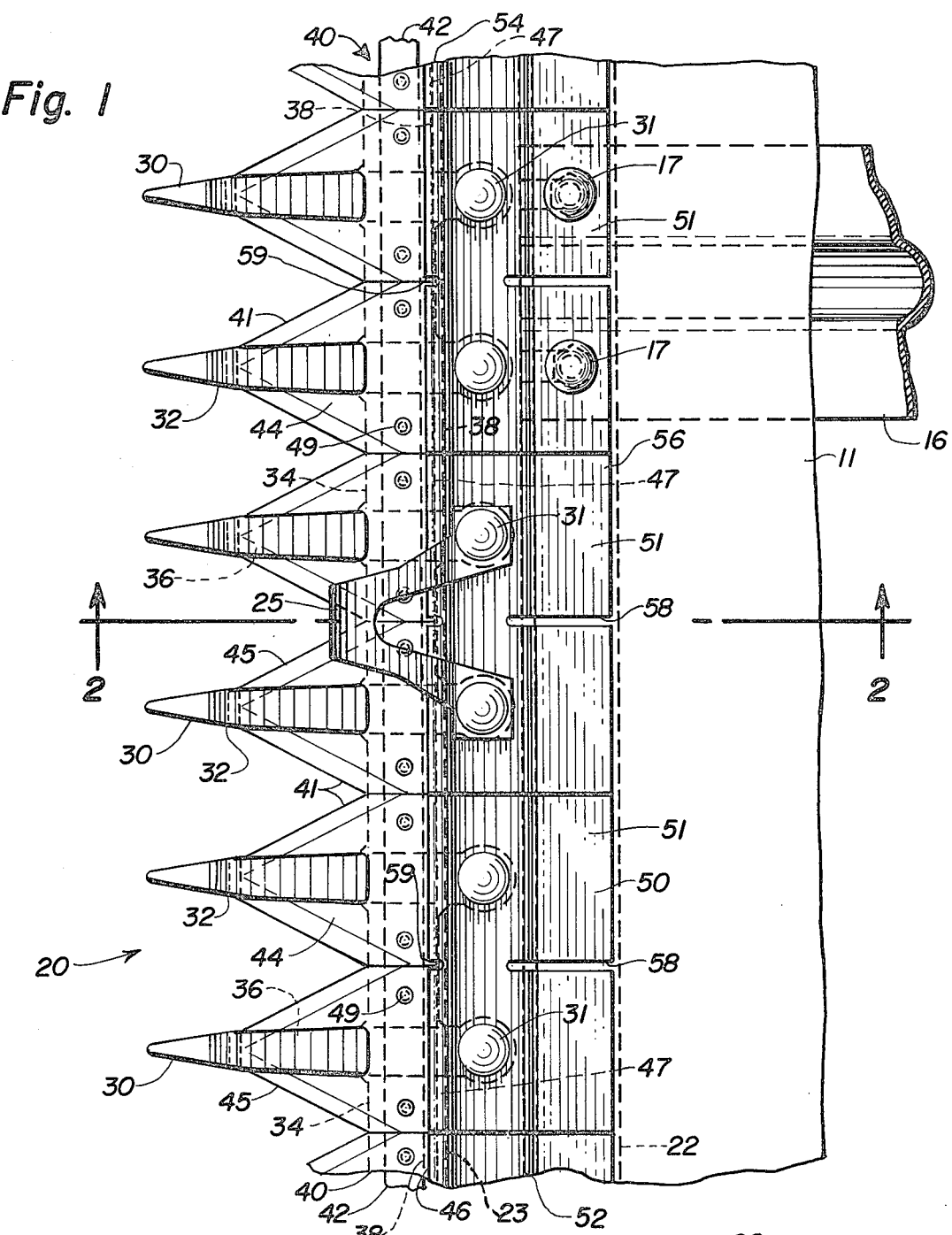
FIG. 1 is a partial plan view of the cutterbar on the crop harvesting machine, commonly referred to as a combine, incorporating the principles of the instant invention.

Referring now to FIG. 1, an enlarged partial plan view of the reciprocating cutterbar 20, as seen in FIG. 3, can be seen. Further reference can be had in FIG. 2, a cross sectional view of the reciprocating cutterbar 20 taken along lines 2—2 of FIG. 1. A reciprocating cutterbar 20 generally includes a support bar 22, a plurality of knife guards 30, a knife assembly 40 and a plurality of hold down clips 25.

Figure 2:
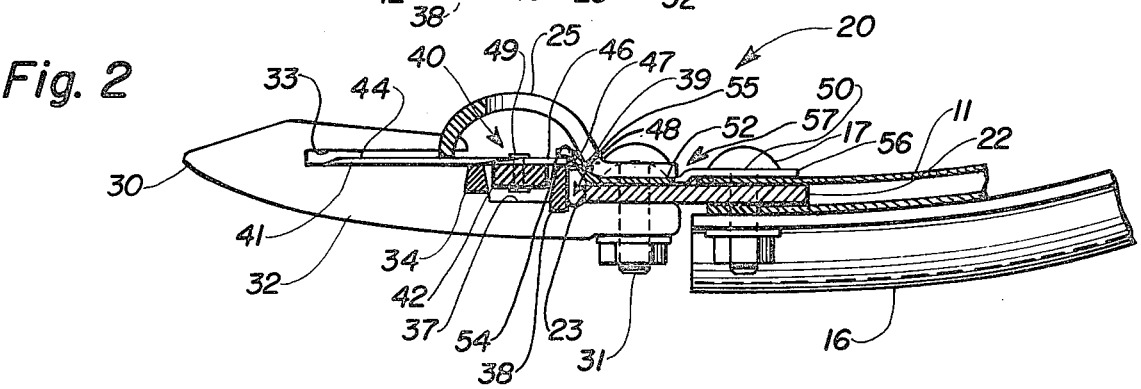
FIG. 2 is a slightly enlarged cross sectional view of the cutterbar taken along lines 2—2 of FIG. 1.

The support bar 22, shown in FIGS. 1 and 2 is being a relatively flat elongated member disposed transverse of the direction of travel of the crop harvesting machine 14, is attached to frame members 16 of the crop harvesting header 10. It should be realized by one skilled in the art that the support bar 22 can have a variety of shapes depending upon the intended function of the reciprocating cutterbar 20. For example, the cutterbar 20 shown in FIGS. 1 and 2 is commonly referred to as a "flexible" cutterbar. A "flexible" cutterbar is permitted to vertically flex a limited amount along its transverse length in order to correspond to changing ground contours so as to cut standing crop material relatively close thereto. Such cutterbars are normally utilized to harvest soybeans because the crop to be harvested grows relatively close to the ground. For a "rigid" cutterbar, i.e. one that does not flex, the support bar 22 might be in the form of an angle iron which would resist flexing and therefore provide a more rigid, stable cutterbar. In FIGS. 1 and 2, the support bar 22 is shown connected to the header frame 16 by the connector bolt 17.

A plurality of knife guards 30 are stationarily mounted to the support bar 22 by connecting bolts 31. Each knife guard 30 includes a finger-like body 32 projecting forwardly substantially parallel to the forward direction of travel of the crop harvesting machine 14. Adjacent finger-like body portions 32 have a trash bar 34 extending therebetween to intercept trash, etc. and prevent it from impacting the remaining parts of the cutterbar 20. The knife guards 30 shown in FIGS. 1 and 2 include a slot 33 in the body 32 through which the knife assembly 40 passes. One skilled in the art should further realize that stub guards, i.e. guards with a smaller body portion 32 and no slot 33, are equivalent to those depicted in the drawings, and, therefore, do not affect the scope of the invention. The knife guards 30 further include a ledger surface 36 machined into the body 32, a support ridge 38 positioned rearwardly of the ledger surface 36 and a transverse trough 37 formed in the body 32 between the ledger surface 36 and the support ridge 38. The support ridge 38 has an upper surface 39 positioned in the same plane as the ledger surface 36.

The knife assembly 40 includes a plurality of knife elements 41 connected adjacent one another to a knife back 42 by rivets 49 (or similar connectors). The knife back 42 is connected to the drive (not shown) to cause reciprocation thereof in a transverse direction within the trough 37 in the knife guards 30. The knife elements 41 are affixed to the knife back 42 in such a manner as to have a forward portion 44 extending forwardly of the knife back 42 and a rearward portion 46 extending rearwardly thereof. The forward portion 44 includes two forwardly converging cutting edges 45 such that the knife elements appear to have a generally triangular shape. The forward portion 44 of the knife elements 41 is supported by the ledger surface 36 of the knife guards 30. Hold down clips 25 keep the forward portion 44 of the knife elements 41 downwardly against the ledger surface 36 so as to form a shearing relationship between the cutting edges 45 and the ledger surface 36 to sever the standing crop material by a shearing action upon reciprocation of the knife back 42 and the knife elements 41 affixed thereto. The rearward portion 46 of the knife elements 41 is supported on the upper surface 39 of the support ridge 38.

The knife guards 30 are available in a variety of sizes and shapes. The use of a standard production knife guard used on hay cutting machinery, so as to reduce costs of manufacturing the cutterbar, can result in a gap 48 between the forward edge 23 of the support bar 22 and the rearward edge 47 of the knife elements 41. This gap 48 can be of sufficient size to permit the passage of severed crop therethrough and increase crop losses. Another source of crop losses is the passage of severed crop material forwardly over the cutterbar 20 beyond the forward portion 46 of the knife elements 41.

As a solution to these problems, a wear strip 50 is provided between the support bar 22 and the support ridge 38 of the knife guards 30. The wear strip 50 includes a first planar portion 52 through which connecting bolts 31 pass to affix the wear strip 50 to the support bar 22. A second elevated portion, integrally joined to the first planar portion, extends in a forward upward direction to terminate immediately above the support ridge 38 and the rearward portion 46 of the knife elements 41 to hold the rearward portion 46 downwardly in position against the upper surface 39 of the support ridge 38. The structural shape of the second elevated portion extending upwardly and forwardly from the first planar portion forms a lip 55 which retards the passage of severed crop material forwardly over the cutterbar 20 and, thereby, minimizes crop losses. Furthermore, since the second elevated portion 54 spans the gap 48 between the forward edge 23 of the support bar 22 and the rearward edge 47 of the knife elements 41, the wear strip 50 prevents severed crop material from passing through the gap 48 and, thereby, further serves to minimize crop losses.

A third rearward portion 56, integrally joined to the first planar portion 52 and extending upwardly and rearwardly therefrom, can form a part of the wear strip 50. This third rearward portion 56 is operable as a "hold down" for the floor 11 of the header 10 when a "flexible" cutterbar 20 is utilized. More specifically, when the support bar 22 flexes in a vertical direction along its transverse length, it is necessary for the corresponding portion of the floor 11 to also flex therewith. The third rearward portion 56 of the wear strip 50 permits the floor 11 to "breathe," i.e. freedom to move in both a fore-and-aft and a transverse direction, during this flexing movement while maintaining its general position relative to the cutterbar. To further enhance this movement, the floor 11 has slots 27 formed therein at positions corresponding to the location of connector bolts 17. Washers 28, having a thickness slightly greater than the floor 11, prevent the wear strip 50 from being fastened tightly to the floor 11.

The wear strip 50 extends substantially continuously along the length of the cutterbar 20 to maximize the minimization of crop losses. One advantage to providing a substantially continuous hold down strip for the rearward edge 46 of the knife elements 40 is that the second elevated portion 54 of the wear strip 50 does not have to be hardened to provide adequate wear capabilities. The wear strip 50 is provided with longitudinally extending slots 58, 59 in the third rearward portion 56 and the second elevated portion 54, respectively, to promote flexibility of the cutterbar 20 in the transverse direction as previously noted. The slots 59 and the second elevated portion 54 of the wear strip 50 are not of sufficient size to allow the passage of severed crop material therethrough. As can be seen in FIG. 1, the wear strip 50 can be in the form of a series of segmental pieces 51 affixed to the support bar 22 adjacent one another so as to provide a substantially continuous wear strip 50. One particular advantage of having the wear strip 50 in segments 51 is that if any one portion of the wear strip 50 becomes damaged replacement and/or service would be relatively easy and inexpensive.

It will be understood that various changes in the details, material, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. In a reciprocating cutterbar assembly forwardly disposed on a mobile crop harvesting machine for the severing of crop material from the ground to initiate the crop harvesting process, said cutterbar being mounted to a harvesting machine frame member, said cutterbar assembly having an elongated support bar affixed to said frame member and disposed transverse to the forward direction of travel of said crop harvesting machine, said support bar having a forward edge spaced forwardly from said frame member; a plurality of knife guards detachably affixed to said support bar and projecting forwardly therefrom, each said knife guard having a ledger surface, a transversely extending vertical support ridge rearwardly of said ledger surface and a transverse trough positioned between said ledger surface and said support ridge, said support ridge having an upper surface in substantially the same plane as said ledger surface; an elongated knife back operatively positioned within said transverse trough for reciprocatory motion therewithin generally parallel to said support bar; and a plurality of generally triangularly shaped knife elements affixed to said knife back, each said knife element having a rearward portion projecting rearwardly of said knife back and a forward portion having forwardly converging cutting edges extending forwardly of said knife back, said knife element being supported on said ledger surfaces and said upper surfaces of said support ridges such that said knife elements shearingly cooperate with said ledger surfaces to sever standing crop material, the improvement comprising:

a wear strip detachably affixed to said support bar and forwardly projecting therefrom, said wear strip terminating above said support ridge on each said knife guard so as to hold said rearward portion of said knife elements downwardly against said upper surface of said support ridges during reciprocation of said knife back and said knife elements affixed thereto, said wear strip including a first generally planar portion, a second elevated portion integrally joined with said first planar portion and extending upwardly and forwardly therefrom and a third portion rearward of, and elevated above, said first portion, said third portion sloping forwardly downwardly and being integrally joined with said first portion, said first portion forming a depression between said second portion and said third portion to catch severed crop material and prevent same from passing forwardly over the cutterbar assembly.

2. The cutterbar assembly of claim 1 wherein said wear strip extends substantially continuously along the transverse length of said cutterbar assembly.

3. The cutterbar assembly of claim 2 wherein said rearward portion of the said knife element terminates in a rearward edge extending substantially parallel to and rearward of said knife back, said rearward edge of said knife elements being spaced forwardly of said forward edge of said support bar a sufficient distance to form a gap therebetween permitting the passage of severed crop material, said wear strip substantially covering said gap to prevent crop material from being lost between said support ridge on said knife guards and said support bar.

4. The cutterbar assembly of claim 3 wherein said second portion slopes upwardly from said first portion to form a lip terminating over said support ridge to retard the movement of severed crop material forwardly over said knife elements.

5. The cutterbar assembly of claim 1 or 4 wherein said wear strip further includes fore-and-aft extending slots formed therein to provide flexibility along the transverse length of said wear strip.

6. The cutterbar assembly of claim 5 wherein said wear strip comprises a plurality of substantially identical individual segments detachably affixed adjacent one another along the transverse length of said support bar.

7. The cutterbar assembly of claim 6 further comprising a plurality of hold down clips detachably connected to, and spaced along the transverse length of, said support bar, each said hold down clip having an arched portion terminating above said knife elements within the line of said ledger surfaces so as to hold said knife elements downwardly against said ledger surfaces and maintain the shearing relationship therebetween.

8. A reciprocating cutterbar assembly disposed at the forward end of the floor of a crop harvesting header attached to a mobile crop harvesting machine for the severing of standing crop material to initiate the crop harvesting process, said header having a frame for support of said floor above the ground, comprising:

an elongated support bar affixed to said header frame and disposed transverse to the direction of travel for said crop harvesting machine, said support bar having a forward edge spaced forwardly of said header frame;

a plurality of knife guards detachably connected to said support bar and projecting forwardly therefrom, each said knife guard having a ledger surface, a transversely extending vertical support ridge spaced rearwardly of said ledger surface and a transverse trough positioned between said ledger surface and said support ridge, said support ridge having an upper surface in substantially the same plane as said ledger surface;

an elongated knife back operatively positioned within said trough in said knife guards for reciprocatory motion therewithin transverse to the direction of travel of said crop harvesting machine;

a plurality of knife elements affixed to said knife back and reciprocable therewith, each said knife element having a rearward portion projecting rearwardly of said knife back and terminating in a transversely extending rearward edge and a forward portion projecting forwardly of said knife back and having cutting edges shearingly cooperating with said ledger surfaces to sever standing crop material, said rearward portion of said knife elements being supported on said upper surface of said support ridges, said rearward edge of said knife elements being spaced forwardly of said forward edge of said support bar a sufficient distance as to permit the passage of severed crop material therebetween; and a wear strip detachably affixed to, and extending substantially continuously along the transverse length of, said support bar, said wear strip projecting forwardly from said support bar and terminating above said support ridge such that severed crop material is prevented from passing between said forward edge of said support bar and said rearward edge of said knife elements, said wear strip being operable to hold said rearward portion of said knife elements downwardly against said upper surface of said support ridge, said wear strip including a first generally planar portion, a second elevated portion integrally joined with said first planar portion and extending upwardly and forwardly therefrom and a third portion rearward of, and elevated above, said first portion, said third portion sloping forwardly downwardly and being integrally joined with said first portion, said first portion forming a depression between said second portion and said third portion to catch severed crop material and prevent same from passing forwardly over the cutterbar assembly.

9. The cutterbar assembly of claim 8 wherein said second portion forms a lip terminating over said support ridge to retard the movement of severed crop material forwardly over said knife elements, said first planar portion of said wear strip being attached to said support bar.

10. The cutterbar assembly of claim 8 wherein said crop harvesting header floor includes a forward edge substantially parallel to said support bar, said forward edge being positioned beneath said third portion of said wear strip, said floor being supported by said frame such that said forward edge of said floor is free to move in a fore-and-aft direction relative to and beneath said third portion of said wear strip, said third portion being operable to prevent said forward edge from moving unrestrained in a vertical direction.

11. The cutterbar assembly of claim 10 wherein said wear strip further comprises a plurality of substantially identical segments detachably affixed adjacent one another along the transverse length of said support bar, each said segment having at least one longitudinal slot therein to provide flexibility along the transverse length of said segment.

12. The cutterbar assembly of claim 11 wherein both said second portion and said third portion of each said segment have a longitudinal slot formed therein.

* * * * *